UNITED STATES PATENT OFFICE.

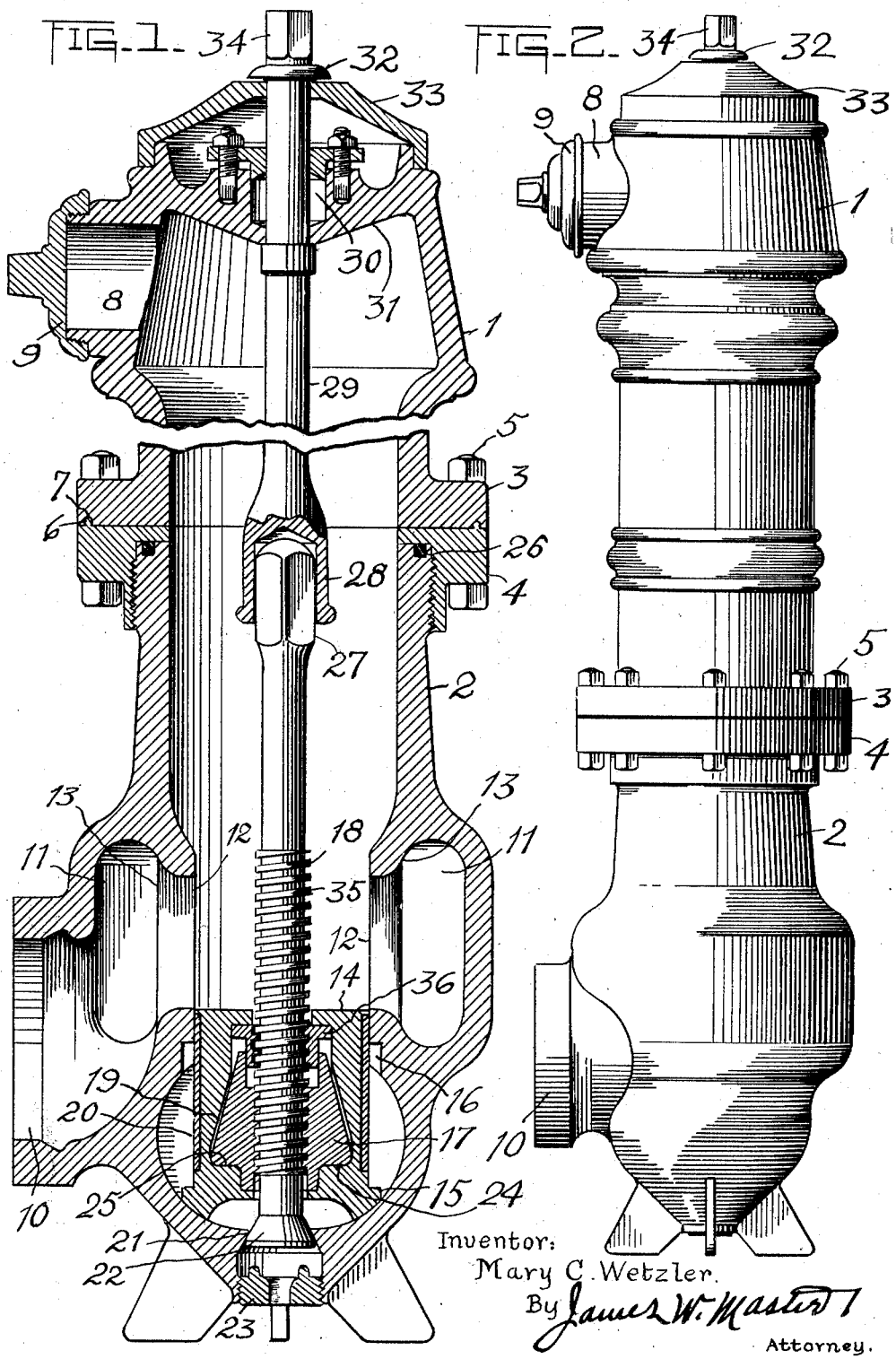

MARY C. WETZLER, OF LOS ANGELES, CALIFORNIA.

FIRE-HYDRANT.

1,360,340.

Specification of Letters Patent.  Patented Nov. 30, 1920.

Application filed January 26, 1920. Serial No. 354,107.

*To all whom it may concern:*

Be it known that I, MARY C. WETZLER, a citizen of the United States, residing at Los Angeles, in the county of Los Angeles and State of California, have invented new and useful Improvements in Fire-Hydrants, of which the following is a specification.

This invention relates to fire hydrants, and its objects are to improve the mechanism for control of the inlet of water into the hydrant, to provide drainage means operative when the pressure is shut off, to provide a valve mechanism which will not leak when the top is broken off or detached, and to simplify the valve stem construction. Other objects and advantages may appear from the subjoined detail description.

In the drawings: Figure 1 is a vertical sectional view of a fire hydrant embodying my improvements; and Fig. 2 is a side elevation of the same.

Referring to the drawings, the upper section 1 and lower section 2 comprise the fire hydrant casing, the upper section being provided with a flange 3, in abutting engagement with a detachable flange 4, on the lower section, said flanges being secured by bolts 5. Flange 4 is provided with an annular ring 6, engaging with a corresponding annular recess 7 in flange 3, to form a fluid tight connection between the casing sections.

The upper section 1 has an outlet plug 8, provided with a screw cap closure 9, but it is to be understood that more than one outlet plug may be employed without departing from the invention.

Casing section 2 is provided with an opening 10, which may be connected to a water main, and which communicates with an annular interior chamber 11, having oppositely disposed ports 12, opening into the interior of the casing. The inner wall 13 is substantially flat for engagement with valve shoes 14, adapted to close said ports. In port closing position, the flanges 15, engage with recesses 16, in walls 13, and limit further upward movement of the shoes. The nut 17, actuated by the screw spindle 18, and substantially coniform to engage with corresponding recesses 19, will force the shoes against ports 12, said shoes having gaskets 20 abutting against the port walls to form a perfect closure. After reaching port closing position, the nut 17 remains stationary while the screw spindle will travel downward, and the drainage valve 21 will be opened, this valve being closed by the conical head 22, on spindle 18. The upward movement of spindle 18 is limited by the engagement of head 22 with valve 21, and its downward movement by engagement with member 23. With ports 12 closed and valve 21 open, the screw spindle may be turned to open the ports, and will first move longitudinally to close valve 21, after which the nut 17 will travel downward until the face 24 engages with corresponding faces 25, on the port closing shoes, after which they will move downward synchronously with the actuating nut, until limited by the casing wall. Upon further rotation of the spindle the head 22 is moved upward to close valve 21.

In case the upper section be broken off, and the flange 3 be broken adjacent to the bolt holes, flange 3 may be removed and a new flange substituted, without removing the lower section of hydrant from the ground. A gasket 26 prevents leakage between flange 3 and casing 2.

The upper rectangular end 27 of spindle 18 is positioned approximately just below the joint formed by the casing sections, and slidably engages with a corresponding socket 28, on the actuating key 29, which extends upward and through a stuffing box 30, formed in web 31, and has secured thereto a flange 32. Flange 32 is supported by the cover 33. The outer end 34, of the key is square to provide for engagement with a wrench.

The valve shoes may be raised or lowered by rotation of the spindle 18 and key 29. As the valve approaches its uppermost position, the shoes 14 will be forced outwardly to close ports 12, and, upon further rotation of the spindle, the drainage valve will be opened. The valve stem is provided with a screw thread 35, so that it may be rotated in the usual manner to open and close the admission ports. The stuffing box will prevent leakage at the upper part of the casing. When the valve shoes are in lowermost position, the two valve ports are fully uncovered, and the rush and pressure of water from the main through the casing is practically unimpeded and unimpaired, an advantage of especial moment in fire hydrant construction. In the fully open position of the port closing shoes, the drainage valve will be closed, thus preventing leakage.

While simple and efficient means are herein provided for accomplishing the objects of the invention, and the elements shown and described are well adapted to serve the purposes for which they are intended, it is to be understood that the invention is not limited to the precise construction exhibited in the drawings, but that changes, alterations, and modifications that may fall within the scope of the appended claims, may be made, the essence of my invention comprising a hydrant casing in two parts, with key and valve spindle detachable, and a plurality of water admission ports closed by vertically sliding shoes, and providing for a practically free passage of the water through the hydrant casing when open.

What is claimed is:

1. In a hydrant, an upper casing section, a transverse flange thereon, a lower casing section, a detachable flange thereon, an annular ring integral with the detachable flange, and engaging with a corresponding recess in the upper flange, and means for securing the two flanges together.

2. In a hydrant, an outer casing, an inlet thereto adapted for connection with a water main, an inner web having oppositely disposed flat walls and ports in the walls, in communication with the inlet, valve shoes sliding within the casing for control of the inlet ports, means for actuating the valve shoes to uppermost and lowermost positions, and means for forcing the valve shoes against said ports in the uppermost position.

3. In a hydrant, a casing, a web therein forming an annular inlet chamber, oppositely disposed ports in the web, valve shoes vertically slidable in the casing and adapted to close said ports in their uppermost position, a moving member positioned between said shoes, a screw spindle to actuate the moving member, means to impart a rotary movement to the spindle, and means to limit the longitudinal movement of the spindle.

4. In a hydrant, a casing, a web therein forming an annular inlet chamber, flat walls in the web provided with oppositely disposed ports, valve shoes to close the ports, a moving member to actuate the valve shoes, actuating means operatively connected to the moving member, a key to operate the actuating means, a drainage valve port in the bottom of the casing, an enlargement on the actuating means to close the drainage port, and means for limiting the movement of the actuating means in the opposite direction.

In testimony whereof I hereunto affix my signature, this 12th day of January, 1920.

MARY C. WETZLER.